Nov. 16, 1965  W. E. ROOD, JR., ETAL  3,217,878
TRASH LIFTING SYSTEM
Filed May 24, 1963  2 Sheets-Sheet 1

INVENTORS
WILLIAM E. ROOD JR.
WILLIAM G. ROOD
BY
*McLaughlin & Cahill*
ATTORNEYS Nov. 16, 1965     W. E. ROOD, JR., ETAL     3,217,878
TRASH LIFTING SYSTEM Filed May 24, 1963     2 Sheets-Sheet 2

INVENTORS
WILLIAM E. ROOD JR.
WILLIAM G. ROOD
BY
McLaughlin & Cahill
ATTORNEYS

United States Patent Office 3,217,878
Patented Nov. 16, 1965

3,217,878
TRASH LIFTING SYSTEM
William E. Rood, Jr., and William G. Rood, both of 9401 S. 8th Ave., Phoenix, Ariz.
Filed May 24, 1963, Ser. No. 282,941
8 Claims. (Cl. 209—78)

The present invention pertains to trash lifting systems, and more specifically, to apparatus for separating trash in a cotton gleaner.

Cotton harvesters of the type designed to retrieve cotton that has been knocked to the ground during harvesting are generally known as cotton gleaners. When retrieving cotton that has been knocked to the ground, the cotton is usually mixed with debris in the form of grass, sticks, dirt, etc. Separating grass or flexible debris from cotton may be a particular problem since, unlike sticks and relatively brittle debris, the flexible debris cannot be crushed and thereby separated from the cotton tufts without injuring the cotton.

Accordingly, it is an object of the present invention to provide a means for separating flexible debris from down cotton.

It is also an object of the present invention to provide a means for removing trash that has been retrieved by a cotton gleaner.

It is still another object of the present invention to remove trash from cotton that has been retrieved from the ground and disposed of the trash without injuring the cotton.

Further objects and advantages of the present invention will become apparent to those skilled in the art as the description thereof proceeds.

Briefly, in accordance with one embodiment of our present invention, we provide a plurality of trash lifting fingers that extend between cotton grasping or gripping means to force trash and debris away from the cotton tufts. Cotton gleaners of the type described here utilize belts or pliant cotton-retrieving members for grasping the individual cotton tufts or bolls that have fallen to the ground after harvesting. These belts transport the retrieved cotton tufts and transfer the tufts to a second transporting means. To prevent trash and debris from being carried by the cotton gripping means, the trash separating fingers extend between the belts so that debris, such as grass, etc., being carried by two or more of the belts engage the fingers.

The fingers may be made to slope away from the line of travel of the debris thus forcing the latter out of the grip of the cotton gripping means and thereby separate the trash from the cotton.

The description of our invention may more readily be understood by reference to the following figures in which.

Figure 1:
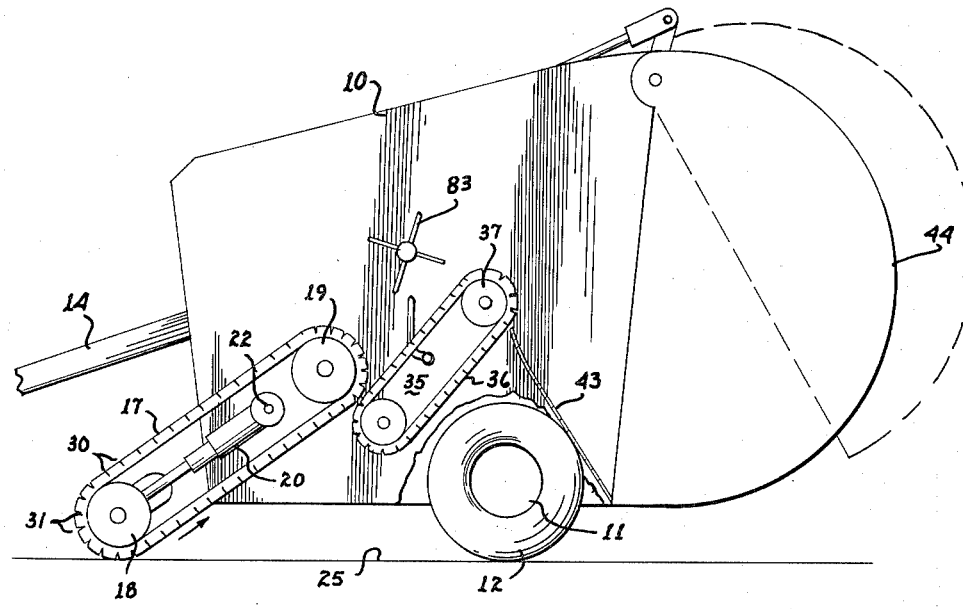
FIG. 1 shows a cotton gleaner having a trash lifting system constructed in accordance with the teachings of the present invention.

Referring to FIG. 1, a cotton gleaner utilizing the trash lifting system of the present invention is shown. The cotton gleaner of FIG. 1 may be of the type shown and described in United States Patent 2,670,584. Various features of the cotton gleaner of FIG. 1 are described and claimed in application Serial No. 89,695, filed Feb. 16, 1961, now abandoned. Basically, the cotton gleaner of FIG. 1 includes a base member 10 upon which is supported a wheel and tire 11 and 12 to enable the gleaner to be transported over a cotton field. A suitable arm 14 is shown to enable the gleaner to be pulled by a tractor or other similar vehicle. The gleaner includes a plurality of pliant belts 17 which extend over pairs of pulleys 18 and 19. The belt is kept taut by a belt tightener arrangement 20 comprising telescoping rods pivoted about shaft 22. The belt tightener arrangement is more adequately described and claimed in application Ser. No. 238,100, filed Nov. 16, 1962, now Patent No. 3,164,027. The belts ride on the ground 25 and are driven thereby. The belts also contain transverse slots 30 which open to form V-shaped slots 31 when the respective belts pass over the pulleys. Since the V-shaped slots 31 open and close as the belts pass over the respective pulleys, that portion of the belt in contact with the ground will grasp cotton tufts on the ground and transport the tufts in the direction shown by the arrow. As the belt flexes over the second pulley and the slots open, the tufts are released onto a second belt and pulley arrangement 35. The second belt and pulley arrangement 35 operates in a manner similar to that described in connection with the previous belt and pulleys. The belt slots open and close as the belt passes over the pulley and grasps cotton tufts provided by the first belt. As the second belts 36 pass over the second set of pulleys 37 and the corresponding slots open, the cotton is thrown centrifugally in a chute 43 for subsequent storage in bin 44.

Figure 2:
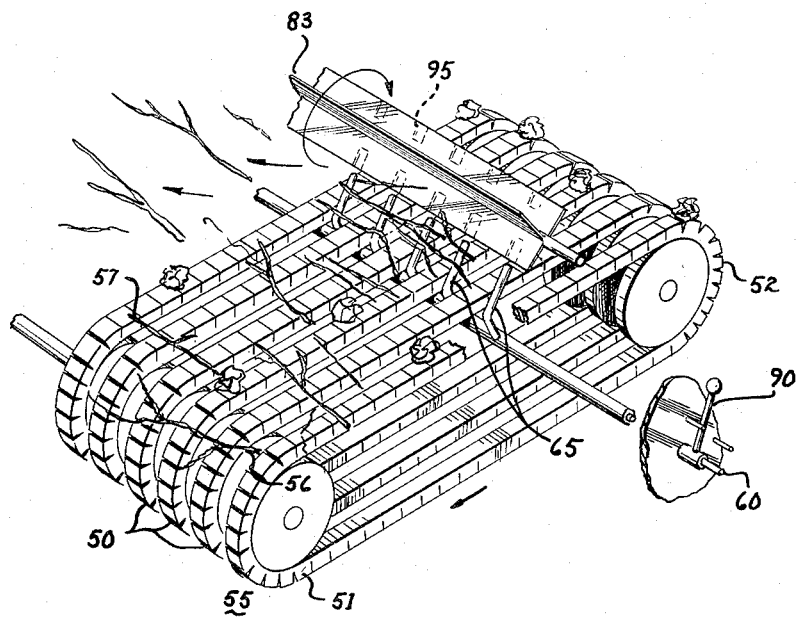
FIG. 2 is an isometric view of a trash lifting system constructed in accordance with the teachings of the present invention.

Referring to FIG. 2, an enlarged portion of FIG. 1, including the trash lifting fingers, is shown. The plurality of cotton gripping means, or belts 50, are shown spaced transversely from each other and each mounted over a corresponding pair of pulleys 51 and 52. As the belts rotate in the direction indicated by the arrow, the transverse slots open and cotton tufts delivered to the second belt by the first belt are grasped in the general area.

Trash and debris indicated schematically at 56 and 57 are also gripped by the cotton gripping means or belts 50. A mounting means or pivot rod 60 is secured to the base member 10 (FIG. 1) and extends transversely of the belts and parallel to the axis of the pulleys. Extending from the pivot rod 10 are a plurality of trash lifting members or fingers 65 each of which is secured to the pivot rod at one end and is extendable into the path of the trash being carried by the belts 50.

Figure 3:
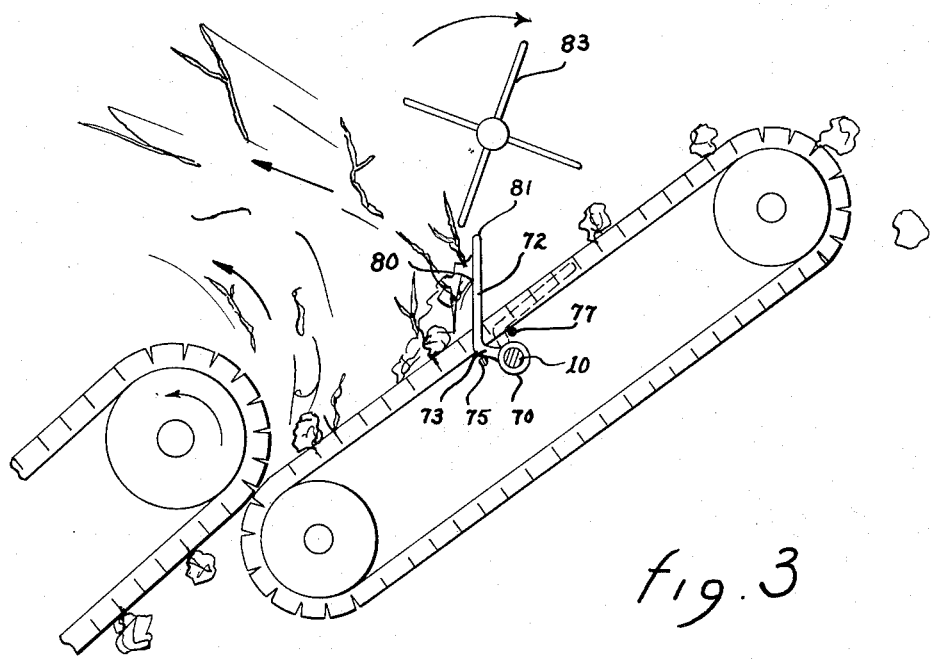
FIG. 3 is an enlarged portion of the cotton gleaner of FIG. 1 showing the trash lifting system of the present invention.

Referring to FIG. 3, a side elevational view of a trash lifting system constructed in accordance with the teachings of the present invention is shown. The end of the pivot rod 10 may be seen in cross section and is provided with a sleeve 70 which is rotatable about the rod. The trash lifting members 72 extend radially for a portion 73 thereof and are bent backwards in the direction of belt travel (bent to the right as shown in FIG. 3) for the remainder of their length. A stop member 75 is provided to insure the correct positioning of the trash lifting members 72 when they are placed in the trash lifting position shown in solid lines. When the trash lifting function is deemed unnecessary, the trash lifting members may be pivoted about the pivot rod to engage a second stop member 77 and to thereby be held in an inoperative position as shown in the dotted lines in FIG. 3. When the trash lifting members are in their operating position, the portions of each member remote from the pivot rod present a sloping surface 80 which intercepts trash being carried by two or more belts and gradually "lifts" the trash out of the grip of the belt. The trash, thus lifted from the belt, is pushed toward the extremity 81 of each of the trash lifting members by pressure exerted by succeeding debris being pushed in the direction of belt travel. As the trash approaches the end of the trash lifting members a trash-throwing member such as a beater or paddle wheel 83, rotating as indicated, throws the debris away from the cotton gripping belt onto any convenient conveyance for disposing of the trash. The trash-throwing member may be notched as indicated at 95 and the member lowered onto the fingers so that the fingers and trash-throwing member are interdigitated. One readily available exit for the debris would be to have the trash thrown as indicated in FIG. 2 onto the top of the first set of flexible belts wherein the trash would be conveyed back to the ground. The material thus thrown to the ground would be presented to the first gripping belts again. This "recycling" is very beneficial since cotton tufts accidentally mixed with the removed debris would be picked up again thus saving otherwise lost cotton. The removed debris may be picked up again but the selectivity of the belts eliminates a substantial portion of the debris. Alternatively, a tray or bin (not shown) may be positioned to receive the trash and convey the trash away from the cotton. It may be noted that, as shown in FIG. 2, the trash lifting members 65 may be placed in an inoperative position by any convenient means such as a handle 90 located on the outside of the cotton gleaner. In this manner, the trash lifting members may be positioned to extend between the inter-belt spaces and thereby remove trash being carried by the belts, or may be retracted below the surface of the belts to thereby render the trash lifting members ineffective.

The operation of the apparatus of the present invention may be described as follows. The cotton gleaner of FIG. 1 is towed, or otherwise moved, over a cotton field in which cotton has previously been harvested. The cotton that has been knocked to the ground (down cotton) is contacted by the flexible cotton gripping means or slotted belts which grasp the cotton tufts and convey the tufts upwardly and rearwardly into the cotton gleaner. As the flexible belt passes over the uppermost pulley, the slots therein open and the cotton is transferred to the second cotton gripping belt. The cotton is once again conveyed upwardly and rearwardly into the cotton gleaner; however, even though a substantial portion of the trash and debris have either been neglected by the belt or removed by other means (not shown), a considerable amount of trash, especially flexible debris, may still exist. Flexible debris such as grass is normally grasped by more than one belt and, as the cotton and trash being conveyed upwardly and rearwardly by the second belt, the debris bridging the inter-belt space engages the trash lifting members and is gradually forced away from the belts until it is pulled from the belt grip. As other debris is forced up the trash lifting members behind the already removed debris on the trash lifting members, the loosened debris is forced toward the outer edge of each of the trash lifters. As the debris reaches the edge of the respective trash lifter, the edges of the vane blades or paddle wheel throw the debris away from the cotton and back to the ground. The debris may be collected in a trough or bin or may be deflected onto the top of the first flexible belt to be conveyed or to tumble back to the earth.

While we have described our invention with reference to a specific embodiment, it will be obvious to those skilled in the art that many modifications and changes may be made without departing from the spirit and scope of the present invention.

We claim:

1. A trash lifting system for separating trash from cotton comprising, a plurality of pairs of pulleys, a plurality of cotton grasping belts each mounted on one of said pairs of pulleys, said belts positioned parallel to each other and spaced transversely from each other to provide an inter-belt space, a pivot rod extending transversely of said belts, trash lifting members extending upwardly from said pivot rod into said inter-belt space for intercepting trash bridging said inter-belt space, and a trash-throwing member positioned adjacent said trash-lifting members for throwing trash adhering to said lifting members away from said lifting members.

2. A trash lifting system, for separating trash from cotton comprising, means for feeding cotton having trash therein, a plurality of pairs of pulleys, a plurality of cotton grasping belts for receiving said cotton and trash each mounted on one of said pairs of pulleys, each of said belts having transverse cuts therein to form V-shaped grooves when said belt bends over said pulleys, said belts and pulleys transversely spaced from each other to provide an inter-belt space, a pivot rod extending parallel to the axis of said pulleys and transversely of said belts, trash lifting members extending upwardly from said pivot rod into said inter-belt space for intercepting trash bridging said inter-belt space, and a trash-throwing member positioned adjacent said trash-lifting members for throwing trash adhering to said lifting members away from said lifting members.

3. A trash lifting system for separating trash from cotton comprising, a plurality of pairs of pulleys, a plurality of cotton grasping belts each mounted on one of said pairs of pulleys, said belts having transverse cuts therein to provide V-shaped grooves when said belts bend over said pulleys, said belts and corresponding pulleys transversely spaced from each other to provide an inter-belt space, a pivot rod extending transversely of said belts and parallel to the axis of said pulleys, said pivot rod positioned on the side of said belts opposite said transverse cuts, trash lifting members extending upwardly from said pivot rod into said inter-belt space for intercepting trash bridging said inter-belt space, and a trash-throwing member positioned adjacent said trash-lifting members for throwing trash adhering to said lifting members away from said lifting members.

4. A trash lifting system as defined in claim 3 wherein said trash lifting members are pivotally supported by said pivot rod.

5. A trash lifting system as defined in claim 4 wherein said trash lifting members extend radially from said pivot rod.

6. A trash lifting system comprising, means for feeding cotton having trash therein, a plurality of pairs of pulleys, a plurality of belts for receiving said cotton and trash each mounted on one of said pairs of pulleys, each of said belts having transverse cuts therein to form V-shaped grooves when said belt bends over said pulleys, said belts and pulleys transversely spaced from each other to provide an inter-belt space, a pivot rod extending parallel to the axis of said pulleys and transversely of said belts, and a trash throwing member positioned adjacent said trash lifting members for throwing trash and cotton adhering thereto lifted by said members back onto said feeding means for recycling through said trash lifting system to reclaim said adhering cotton.

7. A trash lifting system comprising, means for feeding cotton having trash therein, a plurality of pairs of pulleys, a plurality of belts for receiving said cotton and trash each mounted on one of said pairs of pulleys, each of said belts having transverse cuts therein to form V-shaped grooves when said belt bends over said pulleys, said belts and pulleys transversely spaced from each other to provide an inter-belt space, a pivot rod extending parallel to the axis of said pulleys and transversely of said belts, and an interdigitated trash throwing member positioned adjacent said trash lifting members for throwing trash and cotton adhering thereto lifted by said members back onto said feeding means for recycling through said trash lifting system to reclaim said adhering cotton.

8. A trash-lifting system for separating trash from cotton comprising, a plurality of pairs of pulleys, a plurality of cotton grasping belts each mounted on one of said pairs of pulleys, said belts having transverse cuts therein to provide V-shaped grooves when said belts bend over said pulleys, said belts and corresponding pulleys transversely spaced from each other to provide an inter-belt space, a pivot rod extending transversely of said belts and parallel to the axis of said pulleys, said pivot rod positioned on the side of said belts opposite said transverse cuts, trash-lifting members extending upwardly from said pivot rod into said inter-belt space for intercepting trash bridging said inter-belt space, a trash-throwing member positioned adjacent said trash-lifting members for throwing trash adhering to said lifting members away from said lifting members, each of said trash-lifting members extending radially from said pivot rod for a portion of its length and being bent to form an angle with said radial portion for the remainder of its length.

References Cited by the Examiner

UNITED STATES PATENTS

| | | | |
|---|---|---|---|
| 1,600,037 | 9/1926 | Bullard | 209—120 |
| 2,462,682 | 2/1949 | Schubert | 209—78 X |
| 2,710,097 | 6/1955 | Bolles | 209—78 X |
| 3,120,892 | 2/1964 | Henning | 198—179 |

ROBERT B. REEVES, *Primary Examiner.*